US009051128B2

(12) United States Patent
Guo et al.

(10) Patent No.: US 9,051,128 B2
(45) Date of Patent: Jun. 9, 2015

(54) TRANSMISSION DEVICE AND TRANSMISSION METHOD FOR GLASS SUBSTRATE (71) Applicant: Shenzhen China Star Optoelectronics Technology Co., Ltd., Shenzhen, Guangdong (CN)

(72) Inventors: Zhenhua Guo, Shenzhen (CN); Chunhao Wu, Shenzhen (CN); Kunhsien Lin, Shenzhen (CN); Zenghong Chen, Shenzhen (CN); Minghu Qi, Shenzhen (CN); Yunshao Jiang, Shenzhen (CN)

(73) Assignee: Shenzhen China Star Optoelectronics Technology Co., Ltd, Shenzhen, Guangdong (\*) Notice: Subject to any disclaimer, the term of this patent is extended or adjusted under 35 U.S.C. 154(b) by 296 days.

(21) Appl. No.: 13/701,015

(22) PCT Filed: Nov. 27, 2012

(86) PCT No.: PCT/CN2012/085355
§ 371 (c)(1),
(2) Date: Nov. 29, 2012

(87) PCT Pub. No.: WO2014/079077
PCT Pub. Date: May 30, 2014

(65) Prior Publication Data
US 2014/0138208 A1    May 22, 2014

(51) Int. Cl.
*B65G 49/06* (2006.01)
*B65G 13/02* (2006.01)

(52) U.S. Cl.
CPC ............ *B65G 49/064* (2013.01); *B65G 49/065* (2013.01); *B65G 13/02* (2013.01); *B65G 49/068* (2013.01); *B65G 2249/02* (2013.01); *B65G 2201/022* (2013.01)

(58) Field of Classification Search
CPC .............................. B65G 49/065; B65G 13/02
USPC .......................................... 198/493, 780–791
See application file for complete search history.

(56) References Cited

U.S. PATENT DOCUMENTS

| 3,910,402 A | * | 10/1975 | Dean ........................... 198/369.4 |
| 5,927,469 A | * | 7/1999 | Dunifon et al. ................ 198/456 |
| 6,698,159 B2 | * | 3/2004 | Harris et al. ..................... 83/247 |
| 7,004,711 B2 | * | 2/2006 | Ikehata et al. ................ 414/676 |
| 7,329,299 B2 | * | 2/2008 | Moriya et al. ............... 55/385.6 |

(Continued)

FOREIGN PATENT DOCUMENTS

CN    1513739 A    *    7/2004    ............. B65G 49/06

*Primary Examiner* — Mark A Deuble
(74) *Attorney, Agent, or Firm* — Andrew C. Cheng (57) ABSTRACT The present invention provides a transmission device and transmission method for glass substrate. The transmission device includes a transmission channel, a calibration mechanism and a decompression mechanism; wherein the transmission channel for loading and transmitting the glass substrate, the calibration mechanism being for calibrating position of the glass substrate, and the decompression mechanism collaborating with calibrating mechanism for applying a force to the glass substrate reduce the friction between the transmission channel and the glass substrate when the calibration mechanism calibrating the position of the glass substrate. As such, the abrasion or damage problem to the glass substrate can be prevented so as to improve the yield rate of the glass substrate.

15 Claims, 4 Drawing Sheets

(56) References Cited

U.S. PATENT DOCUMENTS

| | | | |
|---|---|---|---|
| 7,376,486 B2* | 5/2008 | Kuribara et al. | 700/213 |
| 7,428,959 B2* | 9/2008 | Jung et al. | 198/493 |
| 7,712,334 B2* | 5/2010 | Kanno et al. | 65/29.11 |
| 2012/0082516 A1* | 4/2012 | Yamamoto et al. | 406/19 |
| 2013/0196576 A1* | 8/2013 | Kuge et al. | 451/261 |
| 2013/0319046 A1* | 12/2013 | Cleary et al. | 65/25.4 |
| 2014/0291125 A1* | 10/2014 | Li | 198/780 |

* cited by examiner

TRANSMISSION DEVICE AND TRANSMISSION METHOD FOR GLASS SUBSTRATE

BACKGROUND OF THE INVENTION

1. Field of the Invention

The present invention relates to the field of transmission equipment techniques, and in particular to a transmission device and transmission method for glass substrate.

2. The Related Arts

Glass substrate is a common part of a liquid crystal display device. In general, during manufacturing, the glass substrate is always transmitted by a transmission device. During transmission, a friction will be occurred between the glass substrate and a transmission channel. Considering the design of glass substrate is often towards thin and light, an abrasion or damage to the glass substrate is prone to occur during transmission.

SUMMARY OF THE INVENTION

The technical issue to be addressed by the present invention is to provide a transmission device and transmission method for glass substrate, to solve the abrasion or damage problem to the glass substrate during transmitting glass substrate.

The present invention provides a transmission device for glass substrate, which comprises: a transmission channel, a calibration mechanism and a decompression mechanism; the transmission channel being configured to load and transmit the glass substrate, the transmission channel comprising: a first mode transmission channel and a second mode transmission channel, disposed in connected manner and to transmit in order; the calibration mechanism being disposed at a junction between the first mode transmission channel and the second mode transmission channel, and for calibrating a position of the glass substrate during transmission; the decompression mechanism comprising a plurality of air tubes and a plurality of air outlets disposed on the air tubes, the air tubes being connected to air outlets, the plurality of air outlets of the plurality of air tubes being arranged in a matrix format with equal intervals, the decompression mechanism being disposed at the junction between the first mode transmission channel and the second mode transmission channel; when the calibration mechanism calibrating the position of the glass substrate, the decompression mechanism blowing air to the glass substrate behind the transmission channel to reduce the pressure of the glass substrate on the transmission channel so as to reduce the friction between the transmission channel and the glass substrate.

According to a preferred embodiment of the present invention, the decompression mechanism further comprises a connecting arm for connecting and fixing a plurality of air tubes.

According to a preferred embodiment of the present invention, the first mode transmission channel is a roller type transmission channel and the second mode transmission channel is a suction disc type transmission channel.

The present invention provides a transmission device for glass substrate, which comprises: a transmission channel, a calibration mechanism and a decompression mechanism; the transmission channel being configured to load and transmit the glass substrate; the calibration mechanism being for calibrating a position of the glass substrate during transmission; the decompression mechanism collaborating with the calibrating mechanism for applying a force to the glass substrate to reduce the friction between the transmission channel and the glass substrate when the calibrating mechanism calibrating the position of the glass substrate.

According to a preferred embodiment of the present invention, the decompression mechanism is disposed on the transmission channel and at one side different from a side loading the glass substrate; when the calibration mechanism calibrates the position of the glass substrate, the decompression mechanism blows air to the glass substrate behind the transmission channel to reduce the pressure of the glass substrate on the transmission channel.

According to a preferred embodiment of the present invention, the decompressing mechanism comprises a plurality of air tubes and a plurality of air outlets disposed on the air tubes, and the air tubes are connected to air outlets.

According to a preferred embodiment of the present invention, the plurality of air outlets of the plurality of air tubes are arranged in a matrix format with equal intervals so that the force on the glass substrate is uniform when the air blows.

According to a preferred embodiment of the present invention, the transmission channel is roller type, and the transmission channel comprises a plurality of roller axes disposed perpendicular to the transmission direction and with intervals, each roller axis is disposed with a plurality of transmission rollers separated with intervals for contacting the glass substrate; the plurality of air tubes are disposed in parallel with the transmission direction; the air tubes and the transmission rollers are disposed in an interleaved manner; and the plurality of air outlets and the roller axes are disposed in an interleaved manner.

According to a preferred embodiment of the present invention, the plurality of air outlets of the plurality of air tubes are arranged in a matrix format with equal intervals so that the force on the glass substrate is uniform when the air blows.

According to a preferred embodiment of the present invention, the decompression mechanism further comprises a connecting arm for connecting and fixing a plurality of air tubes.

According to a preferred embodiment of the present invention, the transmission channel comprises: a first mode transmission channel and a second mode transmission channel, disposed in connected manner and to transmit in order; the calibrating mechanism and the decompressing mechanism are disposed at a junction between the first mode transmission channel and the second mode transmission channel.

According to a preferred embodiment of the present invention, the first mode transmission channel is a roller type transmission channel and the second mode transmission channel is a suction disc type transmission channel.

The present invention provides a transmission method for glass substrate, the method using the above transmission device, and the method comprises: using transmission channel to load and transmit glass substrate; during transmission, using calibrating mechanism to calibrate the position of the glass substrate; when the calibration mechanism calibrating the position of the glass substrate, using the decompression mechanism to apply force to the glass substrate to reduce the friction between the transmission channel and the glass substrate.

According to a preferred embodiment of the present invention, the step of using the decompression mechanism to apply force to the glass substrate to reduce the friction between the transmission channel and the glass substrate specifically comprises: using the decompression mechanism to blow air to the glass substrate behind the transmission channel to reduce the pressure of the glass substrate on the transmission channel.

The efficacy of the present invention is that to be distinguished from the state of the art. Through the disposition of decompression mechanism in the transmission device, the present invention can reduce the pressure of the glass substrate on the transmission channel so as to reduce the friction between the transmission channel and the glass substrate. Furthermore, when the calibration mechanism calibrating the position of the glass substrate, a force is applied to the glass substrate to reduce the pressure of the glass substrate on the transmission channel so as to effectively reduce the slide friction between the transmission channel and the glass substrate. As such, the abrasion or damage problem to the glass substrate can be prevented so as to improve the yield rate of the glass substrate.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following provides a clear and complete description of the technical solution according to the present invention using the drawing and the embodiment. Apparently, the drawings described below show only example embodiments of the present invention, instead of all embodiments. For other embodiments based on the disclosed drawings and embodiments, and obtained by those having ordinary skills in the art without paying any creative effort are also within the scope of the present invention.

Figure 1:
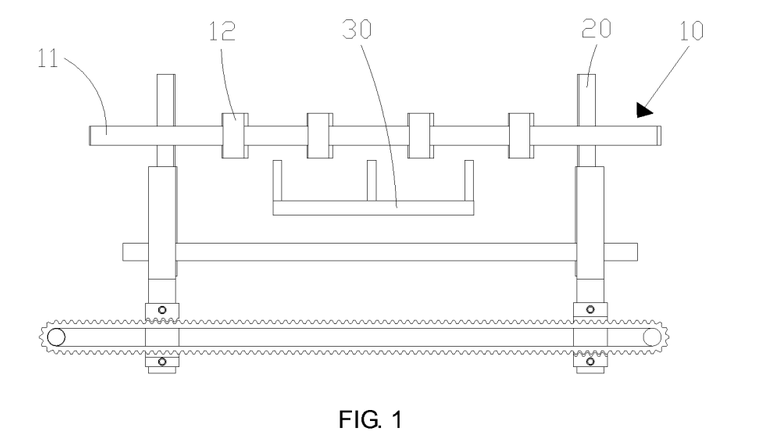
FIG. 1 is a schematic view showing the partial structure of an embodiment of the transmission device according to the present invention.
Figure 2:
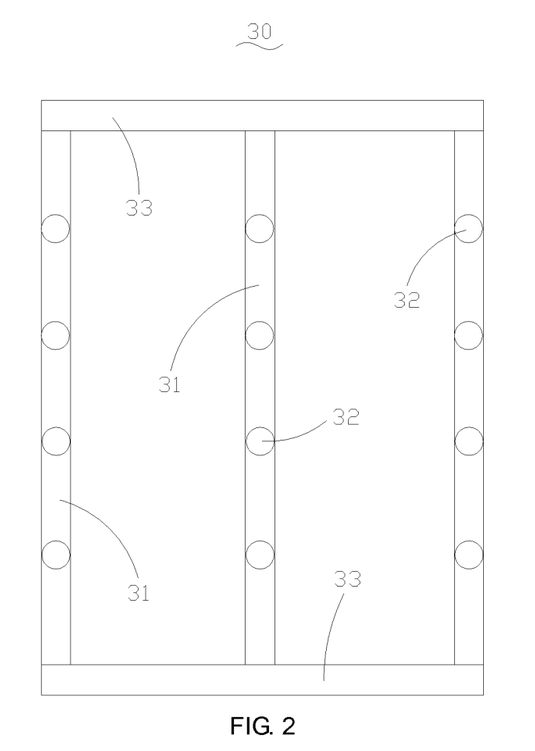
FIG. 2 is a schematic view showing the structure of the decompression mechanism of the transmission device of FIG. 1.

Referring to FIGS. 1-2, in the first embodiment, the transmission device comprises, but is not limited to, transmission channel 10, calibration channel 20 and compression mechanism 30. In the instant embodiment, the calibration mechanism 20 is configured to calibrate the position of the glass substrate during transmission so as to prevent the glass substrate from position deviation and resulting in damage.

In the instant embodiment, the calibration mechanism uses a plurality of positioning pillars (not labeled) to contact the glass substrate from different sides for calibration. In other embodiments, the calibration mechanism 20 can also use other means for calibration, such as, using mechanical arm to calibrate the position of the glass substrate. The present invention does not impose any specific restriction.

In addition, the specific structure of calibration mechanism can also be flexibly configured. In the instant embodiment, positioning pillars is moved by a belt (not labeled) and the belt is driven by a motor (not shown). In other embodiments, the calibration mechanism 20 can also use other structure for positioning or other means to drive the positioning pillar. The present invention does not impose any specific restriction.

The transmission channel 10 is for loading and transmitting the glass substrate, and the decompression mechanism 30 is disposed in accordance with the calibration mechanism 20, for applying force to the glass substrate to reduce the friction between the transmission channel 10 and the glass substrate when the calibration mechanism 20 calibrating the position of the glass substrate.

It should be noted that when the glass substrate deviates from a position and the calibration mechanism 20 is performing the calibration, the glass substrate is prone to move on the transmission channel 10. Because the transmission channel 10 supplies the support to the glass substrate, a friction will occur when the glass substrate moves on the transmission channel 10. When the friction is large or when the glass substrate is too thin, the glass substrate is prone to crack.

The function of the decompression mechanism 30 is to apply a force to the glass substrate to reduce the friction between the transmission channel 10 and the glass substrate so that the friction between the transmission channel 10 and the glass substrate reduces when the glass substrate on the transmission channel 10. As such, the cracking of the glass substrate can be effectively avoided.

For example, the decompression mechanism 30 can be a fan blowing upwards so that the upward air when reduce the friction between the transmission channel 10 and the glass substrate. Alternatively, the decompression mechanism 30 can be a device with a plurality of suction discs and use the plurality of suction discs to suck the glass substrate upwards. Any equivalent means or structure of decompression mechanism 30 is also within the scope of the present invention.

As the glass substrate grows thinner and lighter, the thickness of some glass substrate is about 0.5 mm. Therefore, the cracking is prone to occurring during calibration. The present invention uses decompression mechanism 30 on the glass substrate so as to effectively reduce the friction between the transmission channel 10 and the glass substrate to avoid cracking.

Specifically, in the instant embodiment, the transmission channel 10 is a roller type transmission channel, and the transmission channel 10 comprises a plurality of roller axes 11 disposed perpendicular to the transmission direction and with intervals. Each roller axis 11 is disposed with a plurality of transmission rollers 12 separated with intervals for contacting the glass substrate. It is clear that the present invention puts no restriction on the number or the structure of the roller axis 11 and transmission roller 12.

In other embodiments, the transmission channel 10 can also be other types of transmission channel, such as, conveyor belt, as long as the transmission channel 10 does not interfere with the decompression mechanism 30 to apply force to the glass substrate. The present invention imposes no specific restriction.

In the instant embodiment, the glass substrate is placed on the plurality of the transmission rollers 12. Correspondingly, the decompression mechanism 30 is disposed on the transmission channel 10 and at one side different from a side loading the glass substrate. In other words, in the instant embodiment, the glass substrate is loaded on top of the transmission channel 10 and the decompression mechanism can be disposed below the glass substrate and the transmission channel 10.

When the calibration mechanism 20 calibrates the position of the glass substrate, the decompression mechanism 30 blows air to the glass substrate from behind the transmission channel 10 to share with the transmission rollers 12 a partial support to the glass substrate and reduce the friction on the glass substrate.

Specifically, the decompression mechanism comprises a plurality of air tubes 31 and a plurality of air outlets 32 disposed on the air tubes 31. The air tubes 31 are connected to air outlets 32. In other words, when the air flows in the air tubes 31, the air can flow from the plurality of air outlets 32.

It should be noted that in the instant embodiment, the shape and size of the air tubes 31 and air outlets can vary flexibly. For example, when an air tube 31 is disposed with more air outlets 32, the diameter of the air tube 31 can be larger to allow more air flow. The shape of the air outlet 32 can be round, square or other shape. No specific restriction is imposed here.

In the instant embodiment, the decompression mechanism further comprises a connecting arm for connecting and fixing a plurality of air tubes. Preferably, there are two connecting arms and the two connecting arms are located at to ends of the air tubes 31. In other embodiments, the connecting arm can be flexibly disposed. No specific restriction is imposed here.

In the instant embodiment, when the calibration mechanism 20 calibrating the position of the glass substrate, the decompression mechanism 30 applies a force to reduce the friction between the transmission channel 10 and the glass substrate. As such, the abrasion or damage problem to the glass substrate can be prevented so as to improve the yield rate of the glass substrate.

Figure 3:
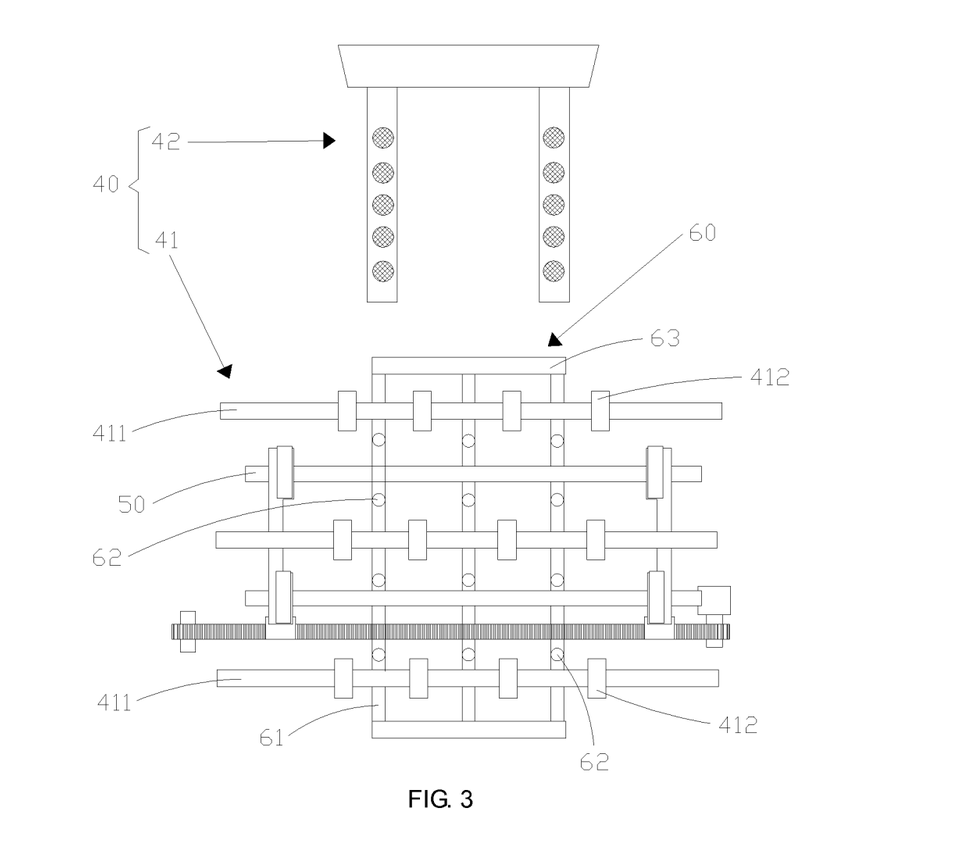
FIG. 3 is a schematic view showing the structure of a second embodiment of the transmission device according to the present invention.

Referring to FIG. 3, in the second embodiment of the transmission device of the present invention, the transmission channel 40 can further comprise a first mode transmission channel 41 and a second mode transmission channel 42, disposed in connected manner and to transmit in order. The calibrating mechanism 50 and the decompressing mechanism 60 are disposed at a junction between the first mode transmission channel 41 and the second mode transmission channel 42.

In the instant embodiment, the first mode transmission channel 41 can be a roller type transmission channel or other types. The second mode transmission channel 42 is a suction disc type transmission channel or other types. It should be understood that the glass substrate is often transmitted on different transmission channels. Therefore, by disposing calibration mechanism 50 at the junction between different transmission channels can effectively prevent cracking or other damages on the glass substrate caused by position deviation.

In the instant embodiment, the decompression mechanism 60 comprises, but is not limited to, air tubes 61, air outlets 62 and connecting arm 63. As the specific structure of the decompression mechanism 60 is similar to the structure in the first embodiment, the description is omitted.

In the instant embodiment, the plurality of air tubes 61 are disposed in parallel with the transmission direction, that is, the transmission direction of the first mode transmission channel 41. The air tubes 61 and the transmission rollers 412 are disposed in an interleaved manner, and the plurality of air outlets 61 on the air tubes 62 and the roller axes 411 are disposed in an interleaved manner. It is clear that in other embodiments, air tubes 61 and air outlets 62 can be disposed in other manners, and the present invention imposes no specific restriction.

Preferably, the plurality of air outlets 62 of the plurality of air tubes being arranged in a matrix format with equal intervals so that the force on the glass substrate is uniform when the air blows. In other words, by arranging the air outlets 62 regularly and generating the same air flow in each air outlet 62, the glass substrate will experience a uniform force so that the contacts between the glass substrate and the transmission roller 412 of the first mode transmission channel 41 experience a uniform force t avoid shifting and resulting in exceeding force at specific contacts.

To ensure the uniform force, the shape of the decompression mechanism 60, and the arrangement of air outlets 62 in particular, should match the glass substrate.

In the instant embodiment, when the calibration mechanism 50 calibrating the position of the glass substrate, the decompression mechanism 60 applies a force to reduce the friction between the transmission rollers 412 of the first mode transmission channel 41 and the glass substrate. As such, the abrasion or damage problem to the glass substrate can be prevented so as to improve the yield rate of the glass substrate.

Figure 4:
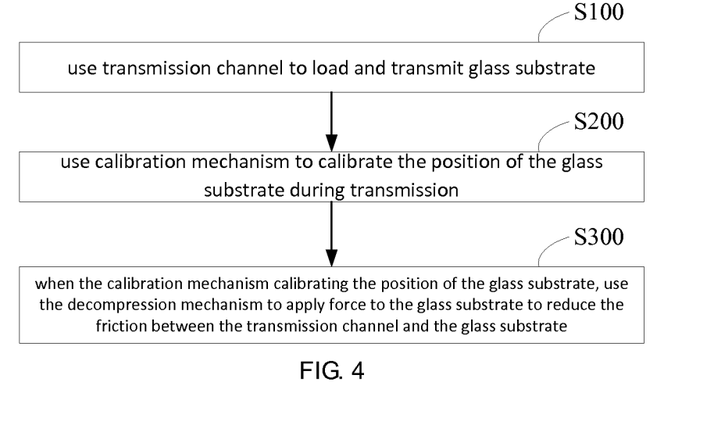
FIG. 4 is a flowchart of an embodiment of the transmission method according to the present invention.

FIG. 4 is a flowchart of an embodiment of the transmission method according to the present invention. The method uses the aforementioned transmission device, comprises, but is not limited to, the following steps.

Step S100: using transmission channel to load and transmit glass substrate.

Step S200: using calibration mechanism to calibrate the position of the glass substrate during transmission.

In step S200: the position of glass substrate can be calibrated according to necessities during operation and no specific restriction is imposed here.

Step S300: when the calibration mechanism calibrating the position of the glass substrate, using the decompression mechanism to apply force to the glass substrate to reduce the friction between the transmission channel and the glass substrate.

It is clear that when the calibration mechanism calibrating the position of the glass substrate, the decompression mechanism applies a force to the glass substrate to reduce the friction between the transmission channel and the glass substrate; and when the calibration mechanism is not performing calibration on the glass substrate, the decompression mechanism is in a standby state or turned off to save energy.

In other embodiments, the step S300 can specifically comprise: using the decompression mechanism to blow air to the glass substrate behind the transmission channel to reduce the pressure of the glass substrate on the transmission channel. In reference of the previous description, those with ordinary skills in this field can easily understand the operation and the description is omitted.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A transmission device for glass substrate, which comprises:
    a transmission channel, the transmission channel being configured to load and transmit the glass substrate, the transmission channel comprising: a first mode transmission channel and a second mode transmission channel, disposed in connected manner and to transmit in order;
    a calibration mechanism, the calibration mechanism being disposed at a junction between the first mode transmission channel and the second mode transmission channel, and for calibrating a position of the glass substrate during transmission; and
    a decompression mechanism, the decompression mechanism comprising a plurality of air tubes and a plurality of air outlets disposed on the air tubes, the air tubes being connected to air outlets, the plurality of air outlets of the plurality of air tubes being arranged in a matrix format with equal intervals, the decompression mechanism being disposed at the junction between the first mode transmission channel and the second mode transmission channel; the decompression mechanism being configured for that when the calibration mechanism calibrating the position of the glass substrate, the decompression mechanism blowing air to the glass substrate behind the transmission channel to reduce the pressure of the glass substrate on the transmission channel so as to reduce the friction between the transmission channel and the glass substrate; and the decompression mechanism further being configured for that when the calibration mechanism is not performing the calibrating to the position of the glass substrate, the decompression mechanism being in a standby state or turned off during transmission of the glass substrate rather than blowing air to the glass substrate so as to save energy;

wherein the first mode transmission channel is roller type, and the transmission channel comprises a plurality of roller axes, each of the plurality of roller axes is disposed perpendicular to the transmission direction and with intervals along the transmission direction, each of the plurality roller axes is disposed with a plurality of transmission rollers being separated with intervals along a direction perpendicular to the transmission direction and for contacting the glass substrate.

2. The transmission device as claimed in claim 1, characterized in that the decompression mechanism further comprises a connecting arm for connecting and fixing a plurality of air tubes.

3. The transmission device as claimed in claim 1, characterized in that the first mode transmission channel is a roller type transmission channel and the second mode transmission channel is a suction disc type transmission channel.

4. A transmission device for glass substrate, which comprises:
a transmission channel, the transmission channel being configured to load and transmit the glass substrate;
a calibration mechanism, for calibrating a position of the glass substrate during transmission; and
a decompression mechanism, the decompression mechanism collaborating with the calibrating mechanism for applying a force to the glass substrate to reduce the friction between the transmission channel and the glass substrate when the calibrating mechanism calibrating the position of the glass substrate, and the decompression mechanism being in a standby state or turned off during transmission of the glass substrate rather than applying the force to the glass substrate when the calibration mechanism is not performing the calibrating to the position of the glass substrate.

5. The transmission device as claimed in claim 4, characterized in that the decompression mechanism is disposed on the transmission channel and at one side different from a side loading the glass substrate; when the calibration mechanism calibrates the position of the glass substrate, the decompression mechanism blows air to the glass substrate behind the transmission channel to reduce the pressure of the glass substrate on the transmission channel.

6. The transmission device as claimed in claim 5, characterized in that the decompressing mechanism comprises a plurality of air tubes and a plurality of air outlets disposed on the air tubes, and the air tubes are connected to air outlets.

7. The transmission device as claimed in claim 6, characterized in that the plurality of air outlets of the plurality of air tubes are arranged in a matrix format with equal intervals so that the force on the glass substrate is uniform when the air blows.

8. The transmission device as claimed in claim 6, characterized in that:
the transmission channel is roller type, and the transmission channel comprises a plurality of roller axes, each of the plurality of roller axes is disposed perpendicular to the transmission direction and with intervals along the transmission direction, each of the plurality of roller axes is disposed with a plurality of transmission rollers being separated with intervals along a direction perpendicular to the transmission direction and for contacting the glass substrate;
the plurality of air tubes are disposed in parallel with the transmission direction;
the air tubes and the transmission rollers are disposed in an interleaved manner; and the plurality of air outlets and the roller axes are disposed in an interleaved manner.

9. The transmission device as claimed in claim 8, characterized in that the plurality of air outlets of the plurality of air tubes are arranged in a matrix format with equal intervals so that the force on the glass substrate is uniform when the air blows.

10. The transmission device as claimed in claim 9, characterized in that the decompression mechanism further comprises a connecting arm for connecting and fixing a plurality of air tubes.

11. The transmission device as claimed in claim 4, characterized in that the transmission channel comprises: a first mode transmission channel and a second mode transmission channel, disposed in connected manner and to transmit in order; the calibrating mechanism and the decompressing mechanism are disposed at a junction between the first mode transmission channel and the second mode transmission channel.

12. The transmission device as claimed in claim 11, characterized in that the first mode transmission channel is a roller type transmission channel and the second mode transmission channel is a suction disc type transmission channel.

13. A transmission method for glass substrate, the method using the transmission device as claimed in claim 4, the method comprises:
using transmission channel to load and transmit glass substrate;
during transmission, using calibrating mechanism to calibrate the position of the glass substrate;
when the calibration mechanism calibrating the position of the glass substrate, using the decompression mechanism to apply force to the glass substrate to reduce the friction between the transmission channel and the glass substrate; and
when the calibration mechanism is not performing the calibrating to the position of the glass substrate, making the decompression mechanism be in a standby state or turned off during transmission of the glass substrate rather than apply force to the glass substrate.

14. The transmission method as claimed in claim 13, characterized in that the step of using the decompression mechanism to apply force to the glass substrate to reduce the friction between the transmission channel and the glass substrate specifically comprises:

using the decompression mechanism to blow air to the glass substrate behind the transmission channel to reduce the pressure of the glass substrate on the transmission channel.

15. The transmission device as claimed in claim 4, characterized in that the decompression mechanism comprises a plurality of suction discs and is configured for using the plurality of suction discs to suck the glass substrate upwards.

* * * * *